US005185204A

United States Patent [19]

Shimizu et al.

[11] Patent Number: 5,185,204

[45] Date of Patent: Feb. 9, 1993

[54] AGGLOMERATE OF WHISKERS OR SHORT FIBERS

[75] Inventors: Tadao Shimizu, Tokyo; Yoshio Aso; Hidefumi Konnai, both of Chiba, all of Japan

[73] Assignee: Kawatetsu Minig Co., Ltd., Tokyo, Japan

[21] Appl. No.: 539,626

[22] Filed: Jun. 18, 1990

[30] Foreign Application Priority Data

Dec. 19, 1988 [JP] Japan ............................ 63-318532

[51] Int. Cl.$^5$ ............................................ B32B 5/16

[52] U.S. Cl. ................................ 428/402; 428/357; 428/903; 23/313 R; 23/313 P; 75/236; 425/222

[58] Field of Search ...................... 428/357, 402, 903; 23/313 R, 313 P; 75/236; 425/222

[56] References Cited

U.S. PATENT DOCUMENTS

| | | | |
|---|---|---|---|
| 3,228,115 | 1/1966 | Swanson | 23/313 R |
| 3,264,069 | 8/1966 | Getty | 23/313 R |
| 3,832,434 | 8/1974 | Flood et al. | 23/313 R |
| 4,670,181 | 6/1987 | Mollinger et al. | 428/402 |
| 4,813,948 | 3/1989 | Insby | 428/903 |
| 4,814,229 | 3/1989 | Tesch | 428/357 |
| 4,820,574 | 4/1989 | Tesch | 428/402 |
| 4,894,088 | 1/1990 | Yamaguchi et al. | 75/236 |
| 4,894,189 | 1/1990 | Dove et al. | 23/313 R |
| 4,911,980 | 3/1990 | Tesch | 428/357 |
| 4,913,956 | 4/1990 | Fay et al. | 428/903 |
| 4,946,807 | 9/1990 | Okuno et al. | 501/89 |
| 4,956,315 | 10/1990 | Mehrota et al. | 501/89 |

FOREIGN PATENT DOCUMENTS

| | | | |
|---|---|---|---|
| 104194 | 12/1971 | Japan | 428/402 |

*Primary Examiner*—Paul J. Thibodeau

*Assistant Examiner*—Mark A. Forman

*Attorney, Agent, or Firm*—Bierman & Muserlian

[57] ABSTRACT

Whiskers having a diameter of 0.1–10 μm and a length of 5–200 μm are pelletized and granulated into agglomerates which have a size of 0.1–10 mm and a bulk density of 0.2–1.0 kg/liter.

To pelletize, powders of whiskers are moistened with water while mixing to form primary aggregates. Then, the powders and the primary aggregates are subjected to a rolling movement to cause the primary aggregates to grow into secondary aggregates having desired size distribution. Finally, the secondary aggregates are dried to obtain pelletized or granulated agglomerates of whiskers.

Handling of whiskers is facilitated because the agglomerates are less bulky and less likely to fly up in the air. When blended into molding materials for fiber reinforcement, however, the agglomerates are readily disintegrated back into separated individual fibers to provide homogeneous dispersion.

5 Claims, No Drawings

AGGLOMERATE OF WHISKERS OR SHORT FIBERS

BACKGROUND OF THE INVENTION

1. Field of the Invention

The present invention relates to an agglomerate of whiskers or short fibers per se fibers usable for fiber-reinforcing various materials such as plastics, rubbers, coatings, metals and ceramics. More particularly, this invention is concerned with pelletized or granulated agglomerates of whiskers or fine short fibers having a diameter of 0.1-10 μm and a length of 5-200 μm.

2. Description of the Prior Art

Various methods have been known for fiber-reinforcement of a variety of molded and formed articles. Relatively large-sized articles are reinforced by the "macro-reinforcement" method. For example, woven cloths of fibers or strands or bundles of fibers having a length in the order of 50 mm are placed in the articles for reinforcement. Alternatively, preforms made from reinforcing fibers may be placed within the molds and the molding materials are subsequently injected therein to form fiber reinforced articles.

In contrast, small sized articles are generally reinforced by the "micro-reinforcement" method wherein reinforcing fibers fibers are kneaded with and dispersed in the molding material prior to molding. Short glass fibers or whiskers have been used for this purpose. Whiskers may be defined as monocrystalline or polycrystalline fibers having a cross-sectional area less than $8\times10^{-5}$ square inches (0.2 mm in diameter) and a length greater than 10 times of the diameter.

When kneaded into the molding materials, the whiskers or glass fibers must be uniformly dispersed throughout the mass of the molding materials. Otherwise, there would be fiber rich and thin portions in the molded articles causing irregular reinforcement. Therefore, it has been the practice to use whiskers and glass fibers in the form of powders in which individual fibers are well segregated and disintegrated from each other.

The problem with such well separated whisker powders is that they are difficult to handle for storage, transportation and mixing, because they are bulky and tend to readily fly up in the air. This is particularly serious with whiskers or short glass fibers having a diameter of 0.1-10 μm and a length of 5-200 μm, because the bulk density thereof is in the order of 0.1 kg/liter.

In order to offset these handling problems, there has been proposed in the art to provisionally solidify the whisker powders by a binding agent. However, the binder tends to preclude individual fibers from being readily separated and uniformly dispersed when blended into the molding materials. In addition, the choice of the binding agent is limited in order to provide miscibility of the binder with the molding material.

SUMMARY OF THE INVENTION

Accordingly, an object of the present invention is to improve or modify whiskers or short fibers, particularly those having a diameter of 0.1-10 μm and a length of 5-200 μm, in such form as to facilitate handling.

Another object of the invention is to transform the whiskers or short fibers in such form in which the bulk density thereof is increased.

A still another object of the invention is to provide whiskers or short fibers in such form in which they are less likely to fly up in the air during handling.

A further object of the invention is to provide whiskers or short fibers in such form as to permit ease of handling and wherein they are readily separated and disintegrated into discrete individual fibers for homogeneous dispersion in the molding material.

Another object of the invention is to provide a process for transforming whiskers or short fibers in such forms as above-mentioned.

The present inventors have discovered that these and other objects are attained by pelletizing or granulating by agglomeration individual whiskers or short fibers to such a degree that the diameter thereof is 0.1-10 mm and the bulk density thereof is 0.2-1.0 kg/liter.

DESCRIPTION OF THE PREFERRED EMBODIMENTS

The pelletized or granulated agglomerates of whiskers or short fibers according to the invention may be made by using various fibrous reinforcing materials having a diameter of 0.1-10 μm and a length of 5-200 μm. Those include whiskers of potassium titanate, whiskers of silicon carbide, whiskers of silicon nitride. Short glass fibers and fibers of basic salt of magnesium and calcium silicates having the similar dimensions may also be used.

The pelletized or granulated agglomerates according to the invention may be manufactured in the following manner.

First, reinforcing fibrous materials in the form of powders, i.e., in the form of dried segregated discrete fibers, are moistened or humidified with water. Moistening may be carried out while mixing and stirring the powders in a mixer. As moistening proceeds, the surfaces of respective fibers become wetted at least in part whereby primary aggregates of moistened fibers are formed. It is believed that in each of the primary aggregates, the moistened fibers are aggregated with each other under the action of the interfacial tension of water film. Preferably, moistening is conducted to such a degree that a film of water is trapped in a capillary state between adjacent fibers in the primary aggregates, because this capillary trapped condition develops strongest cohesion force between aggregated fibers.

Then, the powders together with the primary aggregates thus formed therein are subjected to a rolling movement, with or without further addition of water. This may be done by using a slanted rotating dish, pan or drum, such as a pan pelletizer. Alternatively, a mixer or kneader provided with impellers, such as a Henschel mixer, may be used for this purpose. As rolling movement is imparted, the primary aggregates roll on the moistened but still separated powders. Serving as nuclei, the rolling primary aggregates merge the discrete powders and grow into secondary aggregates of increased size.

Finally, the secondary aggregates are dried to obtain pelletized or granulated agglomerates of whiskers or short fibers. The resulting agglomerates are generally spherical and the diameter thereof varies from 0.1 mm to 10 mm depending on the condition of moistening and rolling movement.

The amount of moisture and the degree of rolling motion imparted to the fibrous powders also affects the bulk density of the resulting granulated agglomerates as well as the cohesive force between fibers in the final products. If moistened in excess, the excessive mass of water would seep out during rolling movement onto the surfaces of the secondary aggregates so that after drying, the fibers in respective agglomerates would be bound with each other in the form of bundles strongly enough to resist subsequent separation and dispersion into the molding materials. If, to the contrary, too small amount of water is added, the fibrous materials would be insufficiently engaged with each other so that it would be difficult to pelletize or granulate the fiber powders.

Moistening and impartation of rolling movement may be conditioned to ensure that the granulated agglomerates have a diameter of 0.1-10 mm and a bulk density of 0.2-1.0 kg/liter. The term "bulk density" as used herein with reference to the pelletized or granulated agglomerate refers to the weight per unit volume of agglomerates deposited in bulk. Proper amount of moisture varies according to the shape of fibrous materials as well as the desired diameter of granulated agglomerates. In the case of a mixture of whiskers having a diameter of 0.7 μm and a varying length of 30-50 μm, the proper amount of moisture is 0.6-1.0 part by weight per one part by weight of whiskers.

It is believed that, in the pelletized or granulated agglomerates thus produced without using a binding agent, individual fibers are agglomerated with each other primarily under the action of physical cohesive force, as opposed to adhesive force developed by a binder. Therefore, when blended into the molding materials, the agglomerates are readily segregated and disintegrated back into individual fibrous materials and may be homogeneously dispersed with ease in the molding materials.

It will be appreciated that the granular agglomerates according to the invention have a bulk density of 0.2-1.0 kg/liter which is considerably high as compared with a bulk density value of 0.1 kg/liter for the conventional fibrous powders. Therefore, the agglomerates of fibers according to the invention are less bulky and their volume per unit weight is a fraction of that of the conventional powders. As a result, handling and transportation are remarkably improved. Another important benefit of the agglomerates is that individual fibers are less likely to fly up in the air during handling so that a high degree of cleanness of working environment is provided. Moreover, the granular nature of the agglomerates and the granule size of 0.1-10 mm considerably improve the flowability of material whereby handling, transportation and blending are facilitated.

It is preferable that a small amount of organometallic compounds, which upon hydrolysis are coupled onto the surfaces of the inorganic fibrous materials, is blended to water or added to the powders in the form of an aqueous solution. Examples of such compounds are organometallic compounds of titanium and aluminium and organometallic compounds of silicon such as silane. These compounds promote pelletization or granulation and thin organic layers formed on the surfaces of whiskers serve to prevent individual whiskers from being excessively strongly agglomerated.

EXAMPLE

Whiskers of potassium titanate, whiskers of silicon carbide, and whiskers of silicon nitride were used which had, respectively, dimensions and physical properties as shown in Table 1. For each kind of whiskers, 10 kg of whisker powders were placed in a Henschel mixer. While mixing and stirring, the powders were moistened with water, with or without addition of 50 milliliter of aminopropyletriethoxysilane as an organometallic compound. The moistened powders were then placed on a slanted rotating dish and subjected to rolling movement for 10 minutes. The product was then dried at a temperature of 105° C. to obtain agglomerates of whiskers. The size and bulk density of agglomerates were measured and the results are shown in Table 1. The size distribution for the agglomerates made from silicon carbide whiskers is indicated in Table 2.

It was observed that the agglomerates of whiskers manufactured in this manner were generally spherical. The agglomerates were then tested for dispersion capability. Each specimen of the agglomerates was put into water. Upon stirring, the agglomerates were promptly segregated to form a slurry in which individual whiskers were homogeneously dispersed. The whole amount of the slurry passed a 100 mesh screen.

Further, each specimen of agglomerates was added to polypropylene resin in an amount of 30% by weight. Each mixture was kneaded at 200° C. for 10 minutes and was formed into sheets. The surface of each sheet was inspected by a microscope of 200 magnifications but any nodule of whiskers was not found at all.

TABLE 1

| Whisker Material | Dimensions and Physical Properties of Whisker | | | | Degree of Moistening (wt %) | Aminopropyletriethoxysilane | Granule Size (mm) | Bulk Density (kg/l) |
|---|---|---|---|---|---|---|---|---|
| | Diameter (μm) | Length (μm) | True Density | Bulk Density | | | | |
| Potassium Titanate | 0.3-0.7 | 20-50 | 3.50 | 0.1 | 70 | not added | 0.2-7 | 0.65 |
| | | | | | | added | 0.3-10 | 0.70 |
| Silicon Carbide | 0.1-1 | 5-200 | 3.19 | 0.1 | 64 | not added | 0.1-10 | 0.53 |
| | | | | | | added | 0.2-10 | 0.61 |
| Silicon Nitride | 0.1-1.6 | 5-200 | 3.18 | 0.12 | 64 | not added | 0.3-7 | 0.62 |
| | | | | | | added | 0.3-10 | 0.65 |

TABLE 2

| Granule Size (mm) | <0.149 | 0.149-0.297 | 0.297-0.59 | 0.59-1.19 | 1.19-2.38 | 2.38-5.66 | 5.66-10 |
|---|---|---|---|---|---|---|---|
| Weight % | 0.04 | 0.06 | 1.5 | 17.8 | 42.1 | 31.3 | 7.2 |

We claim:

1. A pelletized agglomerate for reinforcement consisting essentially of whiskers or short fibers having a diameter of 0.1-10 μm and a length of 50-200 μm, said agglomerate having a diameter of 0.1-10 mm and a bulk density of 0.2-1.0 kg/liter.

2. An agglomerate consisting essentially of whiskers or short fibers comprising:

individual whiskers or short fibers having a diameter of 0.1-10 μm and a length of 5-200 μm, said whiskers or short fibers in said agglomerate being substantially physically cohered with each other to such a degree as to establish a bulk density of 0.2–1.0 kg/liter to facilitate handling but to permit separation back into individual whiskers or short fibers to enable the whiskers or short fibers to be homogeneously dispersed when mixed with a material to be reinforced, said agglomerate having a diameter of 0.1–10 mm.

3. An agglomerate according to claim 1, wherein said whiskers or short fibers are whiskers of potassium titanate.

4. An agglomerate according to claim 1, wherein said whiskers or short fibers are whiskers of silicon carbide.

5. An agglomerate according to claim 1, wherein said whiskers or short fibers are whiskers of silicon nitride.

* * * * *